(12) United States Patent
Stadtfeld

(10) Patent No.: US 11,585,368 B2
(45) Date of Patent: Feb. 21, 2023

(54) SELF-LOCKING SCREW FOR BEVEL GEAR CUTTER

(71) Applicant: THE GLEASON WORKS, Rochester, NY (US)

(72) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 390 days.

(21) Appl. No.: 16/794,803

(22) Filed: Feb. 19, 2020

(65) Prior Publication Data

US 2020/0271153 A1    Aug. 27, 2020

Related U.S. Application Data

(60) Provisional application No. 62/809,162, filed on Feb. 22, 2019.

(51) Int. Cl.
*F16B 39/30*    (2006.01)

(52) U.S. Cl.
CPC .................... *F16B 39/30* (2013.01)

(58) Field of Classification Search
CPC ........ F16B 39/30; F16B 39/284; F16B 39/28; F16B 39/34; F16B 39/282
USPC .......................... 411/309, 305, 306, 301, 302
See application file for complete search history.

(56) References Cited

U.S. PATENT DOCUMENTS

| | | | | |
|---|---|---|---|---|
| 3,182,702 A | * | 5/1965 | Nason | F16B 39/34 411/304 |
| 3,182,703 A | * | 5/1965 | Smyth | F16B 39/34 470/11 |
| 3,203,041 A | * | 8/1965 | Beuter | B23G 9/002 264/318 |
| 3,285,310 A | * | 11/1966 | Boots | F16B 39/34 411/301 |
| 3,306,330 A | * | 2/1967 | Wallace | F16B 39/34 411/304 |
| 3,474,845 A | * | 10/1969 | Podell | F16B 39/34 470/9 |
| 5,704,748 A | * | 1/1998 | Criswell | F16B 39/34 411/304 |
| 6,120,217 A | | 9/2000 | Stadtfeld et al. | |
| 10,035,200 B2 | | 7/2018 | Stadtfeld et al. | |
| 10,391,569 B2 | | 8/2019 | Stadtfeld et al. | |

FOREIGN PATENT DOCUMENTS

CN    104454888    *  3/2015

* cited by examiner

*Primary Examiner* — Mark R Wendell
(74) *Attorney, Agent, or Firm* — Robert L. McDowell

(57) ABSTRACT

A self-locking screw wherein the self-locking function is maintained during many cutter head building and truing cycles. The inventive screw includes a self-locking feature having high elasticity and high self-locking torque. The screw includes a slot filled with an elastic compliant material.

16 Claims, 4 Drawing Sheets

SELF-LOCKING SCREW FOR BEVEL GEAR CUTTER

FIELD OF THE INVENTION

The invention is directed to gear cutting tools for bevel gears and in particular to screws for the gear cutting tools.

BACKGROUND OF THE INVENTION

Common face cutters for bevel gear cutting have several blade groups with each group having between one and four blades. For example, see U.S. Pat. No. 6,120,217. The most common cutters are alternating (completing) cutters with one outside and one inside blade per blade group. In order to achieve an equal chip load of all inside blades and all outside blades during the cutting process, the cutting edges of all outside blades preferably follow each other at the same radial position. Likewise, all inside blades should follow each other at the same radial position. In other words, all cutting edges of one kind (inside or outside) should generate the same cone surface while the cutter is rotating.

Manufacturing tolerances of the cutter head body, the blade blanks and deviations in blade profile grinding will introduce different cutting edge locations for the different blades in one cutter head.

As disclosed in U.S. Pat. No. 10,035,200, radial blade adjustment in stick blade cutter heads comprises at least one adjustment screw adjacent to the main clamp screw wherein movement of the adjustment screw effects sliding or rolling of the cutting blade radially into a position which assures the same radial position of all cutting edges (outside blades and all inside blades) within a certain tolerance.

Preferably, the adjustment screw of radially adjustable cutters has fine treads, as opposed to the standard threads of the clamp screw, in order to support the precise radial adjustment of the blades. The torque on adjustment screws is low and may vary between 2 and 20 Nm for example. In particular, in case of very low torque on the adjustment screws it has been experienced that, during the cutting process while cutting a high quantity of parts, cutting vibrations can initiate an adjustment screw turning itself outward which changes the radial adjustment of the particular blade.

If adjustment screws loosen during the cutting of a quantity of parts, the advantage of radial blade truing is diminished or even eliminated.

One solution of this problem is the lock spring design as disclosed in U.S. Pat. No. 10,391,569 which prevents the adjustment screw from loosening and unscrewing itself. However, the lock spring design preferably includes a pre-load of the adjustment screw which is similar to those cutter heads without the lock spring. The pre-load is commonly 7 Nm which is applied to all adjustment screws before the radial truing process begins.

The pre-load presents a disadvantage to the truing and to the operation of a radially trued cutter head. The pre-load has to be increased by the amount of the truing torque in order to slide the blade into the correct radial position. Because the truing torque has values between 2 and 20 Nm, the total torque on the adjustment screws may be 25 Nm or more. Such a high torque makes it more difficult to perform the truing procedure which is a high precision adjustment of each cutter blade. High precision movements and high forces and torques are contradictory to one another. A further disadvantage of the combination of pre-load and truing torque is the fact that the blades experience a higher bending. The bending is a side effect if the radial truing principle of U.S. Pat. No. 10,035,200, which is significantly higher in case a pre-load, has to be applied.

Certain lock screws are known to utilize slots filled with compliant material wherein the slots are not open. FIG. 6 shows a two-dimensional view of a state of the art lock screw 64 which has a slot 61 that is closed on both sides (toward the screw head 65 and the tip 60). The two flexing sections 62 and 63 have a high spring constant in combination with very small deflection amounts. Due to the fact that the slots are closed on both sides, the spring constant is high but the allowable deflection amount is very small. The small deflection amount allows for no meaningful locking effect in a cutter head and the ultimate strength limit can be easily exceeded thereby resulting in the occurrence of plastic deformation. This deformation was caused by hair cracks within the crystal structure of the screw steel which damaged the screw and eliminated any locking effect. Such lock screws are unsuitable as cutter head adjustment screws.

SUMMARY OF THE INVENTION

The present invention comprises a self-locking screw wherein the self-locking function is maintained during many cutter head building and truing cycles. The inventive screw comprises a self-locking feature having high elasticity and high self-locking torque.

DETAILED DESCRIPTION OF THE PREFERRED EMBODIMENT

Figure 1:
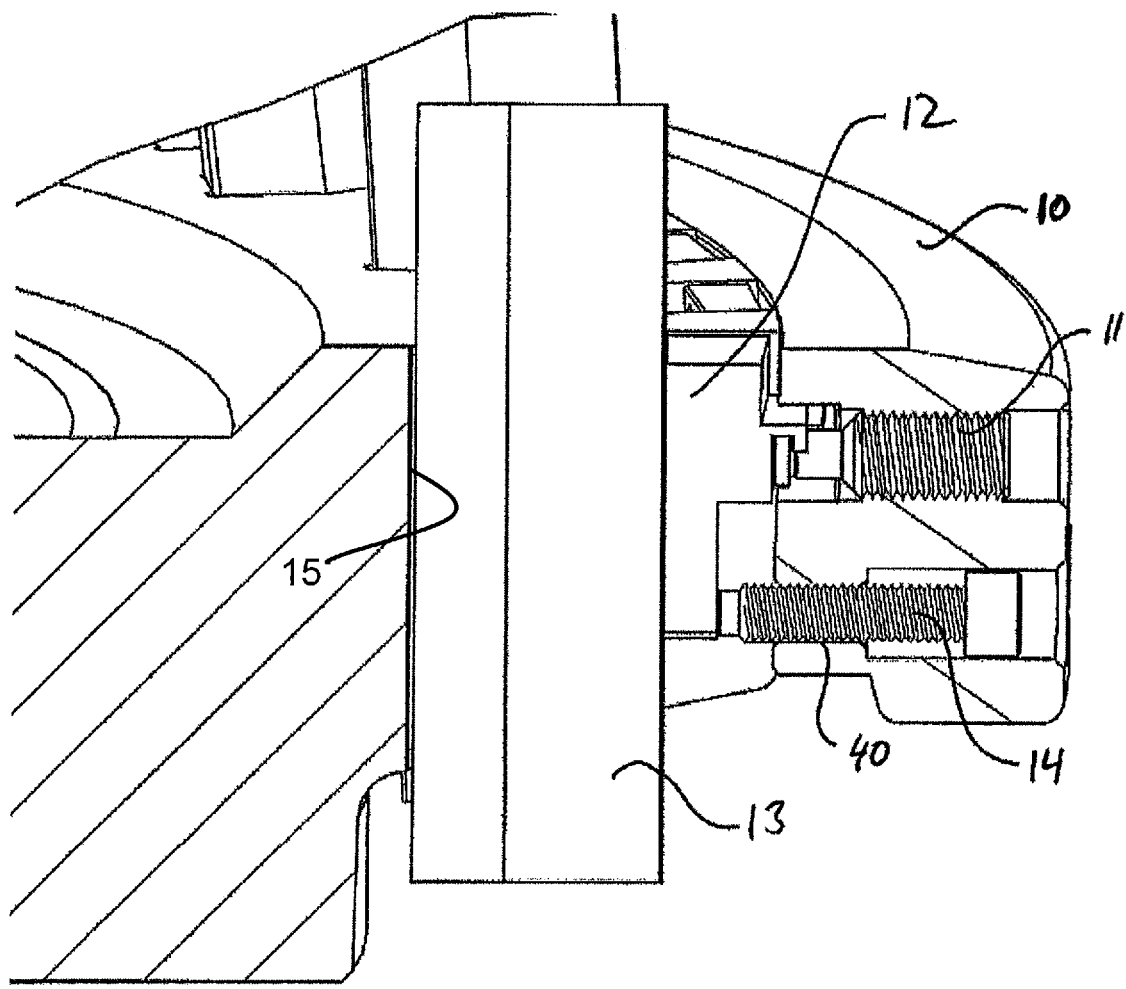
FIG. 1 illustrates a cross sectional view of clamp screw and adjustment screw in a radially truable face cutter head.

The terms "invention," "the invention," and "the present invention" used in this specification are intended to refer broadly to all of the subject matter of this specification and any patent claims below. The use of "including", "having" and "comprising" and variations thereof herein is meant to encompass the items listed thereafter and equivalents thereof as well as additional items. Statements containing these terms should not be understood to limit the subject matter described herein or to limit the meaning or scope of any patent claims below.

Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

Although references may be made below to directions such as upper, lower, upward, downward, rearward, bottom, top, front, rear, inner, outer, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

The details of the invention will now be discussed with reference to the accompanying drawings which illustrate the invention by way of example only. In the drawings, similar features or components will be referred to by like reference numbers.

The invention comprises a self-locking screw with a high self-locking torque (i.e. the amount of torque required to turn the screw in or out when not in contact with a clamp block or cutting blade), preferably of about 5-10 Nm, and a high elasticity. It is important for a self-locking adjustment screw that the self-locking function is maintained during many (e.g. several hundred) cutter head building and truing cycles. Preferably the self-locking screw is inexpensive and easy to manufacture. By comparison, the locking torque of presently commercially available self-locking screws is very low (e.g. 2 Nm and less) and the value diminishes after a single use.

FIG. 1 shows a three dimensional view of a bevel gear cutter head 10 with a cross sectional cut through a cutting blade mounting and positioning slot 15. The upper screw 11 is a clamp screw which is in contact with a clamp block 12 in order to hold a cutting blade 13 in position. The lower screw 14 is an adjustment screw which just contacts the lower end of the clamp block 12. Gear cutters of the type shown in FIG. 1 may be used in the production of bevel gears including straight, spiral and hypoid as well as face and crown gears.

Figure 2:
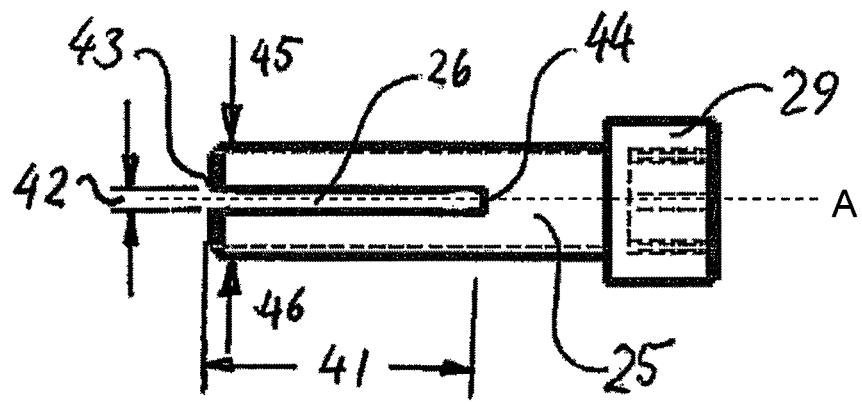
FIG. 2 shows a slotted adjustment screw according to the invention.

FIG. 2 shows an inventive self-locking screw 20 that includes a slot 26, machined into the shaft or screw length portion 25 of screw 20, with the slot 26 extending in an axial direction (A). The shaft or screw length portion 25 has a length L (FIG. 3) with all or a portion of the length L being threaded. Any non-threaded portion of the screw length L between the axial inner end of a thread and the head 29 is referred to as the shank portion (e.g. 38 in FIG. 5) of the screw 20. Slot 26 may be formed in the screw shaft 25 such as by milling with a disk or end mill, slot grinding or electrical discharge machining (EDM), for example.

Slot 26 is open at the end or tip 43 of the shaft 25 opposite from the screw head 29. The head 29 may comprise a standard socket configuration such as hexagonal (e.g. ALLEN or hex head) or a six-point star pattern (e.g. TORX screw) for example. For example, screw 20 may be a known type such as M8×1 with a thread length of 30 mm. As mentioned, the threaded length of screw 20 may extend the entire distance L from the tip 43 to the head 29 (see FIG. 3 or 4 for example) or the threaded length may extend only a portion of the distance from the tip 43 toward the head 29 with any remaining unthreaded portion being a "shank" portion (see FIG. 5).

Figure 3:
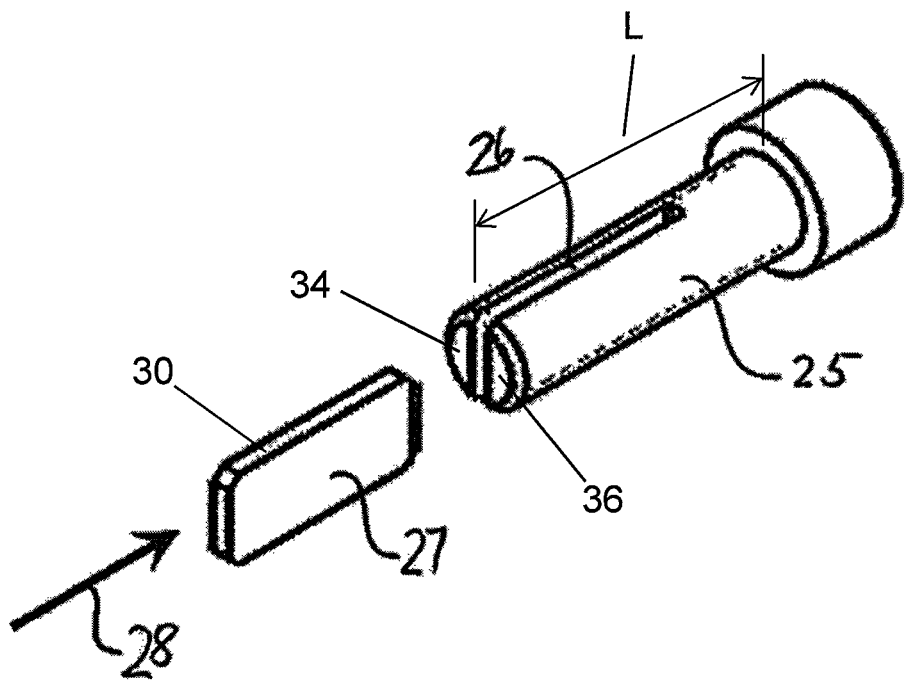
FIG. 3 illustrates a self-locking slotted adjustment screw and elastic compliant sheet.

FIG. 3 shows the inventive slotted screw 20 with a sheet of an elastic-compliant material 27 positioned in front of the screw slot 26. The sheet 27 has a length, extending in the axial direction of the screw 20, a width (screw thread diameter direction) and a thickness defined between opposing outer surfaces of the sheet 27 (in the slot width direction 42) with opposing lengthwise edges 30, 31 being defined between the opposing outer surfaces of the sheet 27. The sheet of elastic compliant material 27 is inserted into the slot in direction 28 (axial direction of the screw 20. The slot 26 is filled with the elastic compliant material such as a thermoplastic material, examples of which include acrylic, polyester, polypropylene, polystyrene, nylon and polytetrafluoroethylene (PTFE) of which TEFLON (a registered trademark of The Chemours Company) is a known brand. Of the above examples, polytetrafluoroethylene (PTFE) is preferred.

The thickness of the elastic compliant material 27 is slightly greater than the width 42 of the slot 26. The slot length 41 (e.g. 20 mm for the M8×1 example) provides the spring constant. A short slot 26 has a higher spring rate but the deflection amount which bends the steel of the screw beyond the ultimate strength limit back into a permanent position (with no locking effect) is low. A long slot 26 has a lower spring rate, but the deflection amount is high before the steel of the screw reaches the ultimate strength limit. Therefore, high elasticity in combination with a high spring rate is preferred and this has been realized by the introduction of the sheet of elastic compliant material 27. In general, it is preferred that the ratio of the length of the slot (e.g. 41 in FIG. 2) to the length of the screw shaft 25 (from the tip to inner side of the head, e.g. L in FIG. 3) is about ⅔.

The elastic compliant material is pressed into the slot 26, which expands the slot by a small amount. The slot width 42 machined into the example M8×1 screw is, for example, 1.4 mm wide. If an elastic compliant sheet 27 having a thickness of, for example, 1.7 mm is pressed into the slot 26, the slot expands at the tip 43 of the screw by about 0.4 mm to about 1.8 mm. The expanded slot width is greater than the thickness of the elastic compliant sheet 27 because the slot 26 is bent open at the tip 43 but has a firm contact between slot and elastic compliant sheet in the middle of the slot length 41. At the inner end 44 of the slot 26, opposite to the opening at the screw tip 43, the elastic compliant material 27 and the slot 26 have a press fit condition.

At the tip 43 of the screw, there is no contact between slot 26 and elastic compliant sheet 27, but rather there exists a small air gap of about 0.05 mm per side between the opposing sides of sheet 27 and a respective surface of the slot 26. In order to make it easier to start the self-locking screw in a tapped hole, it is preferable to press the screw together at the tip 43 where the gap developed. This can be done either by tapping it with a plastic mallet or by pressing with a pressing device in opposed directions 45 versus 46. After reducing or eliminating the air gap at the tip 43 of the screw by tapping or pressing, it is easier to start the screw in the tapped hole 40 of the cutter head 10.

Figure 4:
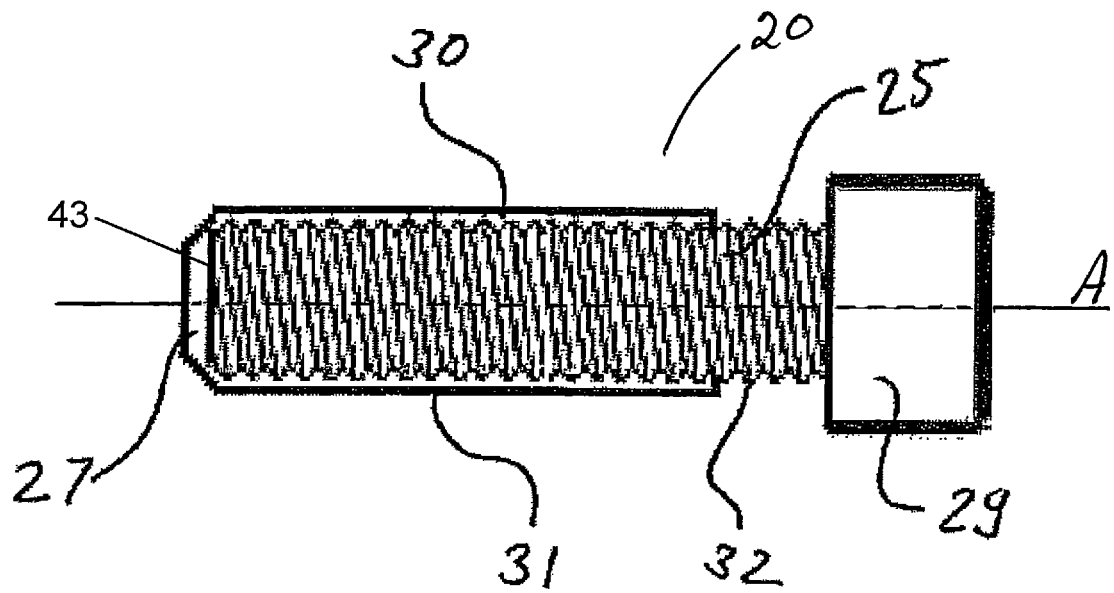
FIG. 4 illustrates a self-locking slotted adjustment screw with inserted elastic compliant sheet.
Figure 5:
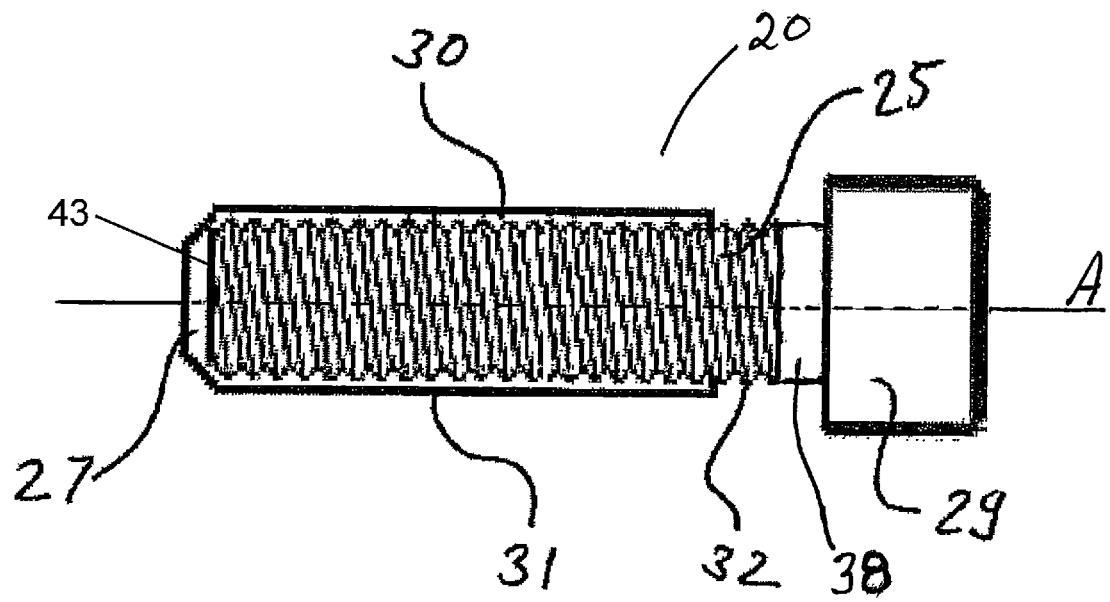
FIG. 5 shows a self-locking slotted adjustment screw with a shank portion and with inserted elastic compliant sheet.
Figure 6:
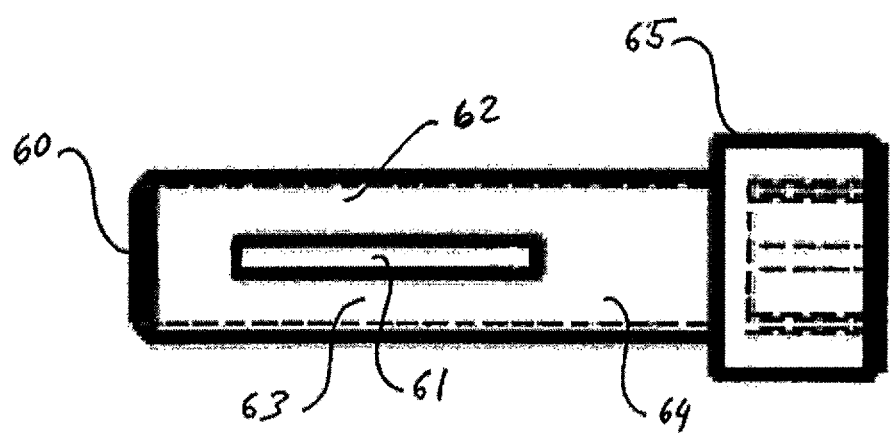
FIG. 6 shows a prior art self-locking screw.

FIG. 4 shows a two-dimensional side view of the inventive self-locking screw 20, where the slot 26 is filled with a sheet of elastic compliant material 27. The gap at the tip 43 of the screw (not shown) is closed after tapping or pressing it together as discussed above. The self-locking screw shown in FIG. 4 is ready for its first use. Preferably, the elastic compliant material at the opposing lengthwise edges 30, 31 adjacent to the screw threads has no threads in the pre-first-use state. The sheet is merely cut off flush to the outside of the screw threads 32. It is also possible to insert a sheet which already has a width equal to the outside diameter (i.e. thread diameter) of the screw. FIG. 5 is similar to FIG. 4 but with the shaft 25 including a shank portion 38.

During the first use of the inventive lock-screw 20, the elastic compliant sheet 27 receives threads at the outside just by a plastic deformation due to the interference with the tapping in the screw hole at the time it is screwed in the tapped hole 40 in the cutter head 10. This way of breaking in (or priming) the lock-screw 20 is preferred because it assures a tight fit between the threaded section of the elastic compliant sheet 27 and the tapping in the screw hole 40.

The described way of priming the lock-screw 20 is, in addition the assured tight fit, also less expensive than other methods which would require an additional manufacturing step to form threads on the elastic compliant sheet 27. However, the self-locking screw develops only a very small amount of the self-locking torque from the interference condition between the tapped hole and the unthreaded elastic compliant material. The majority of the self-locking torque is created by bending the two screw parts 34, 36 (FIG. 3), which are separated by the slot 26 (spring constant) and by compressing the elastic compliant material 27.

The self-locking effect is optimal after the insertion of the elastic compliant sheet 27 and after reducing or eliminating the gap at the tip 43. For the example of the M8×1 screw, the inventive self-locking screw develops a self-locking torque of about 7 Nm.

The self-locking torque can be controlled with the length 41 of the slot 26 and the interference amount of the elastic compliant material which is based on the thickness of the elastic compliant material. The preferred embodiment for the thickness of the slot is about 1.4 mm in the case of an M8×1 screw. However, it is to be understood that slot length, thickness and the interference amount of the elastic compliant material will be proportionally different if the inventive principle is applied to different size screws.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A self-locking screw, said screw having an axis and comprising a head, a shaft and a tip, with the shaft having an axially-extending shaft length and a diameter with at least a portion of the shaft length being threaded, said screw further comprising:
    said shaft comprising a slot located within said shaft, said slot extending the entire diameter of the shaft and being open at the tip and having a slot width and a slot length with the slot length extending from the tip along a portion of the shaft length, said slot width being the same along said diameter of the shaft,
    said slot separating said shaft into a first screw part and a second screw part as a result of said slot extending along said portion of the shaft length,
    said slot being filled with an axially-inserted elastic compliant material,
    wherein self-locking torque is created by bending the first and second screw parts due to said elastic complaint material being axially-inserted into and filling said slot.

2. The screw of claim 1 having a ratio of slot length to shaft length of about ⅔.

3. The screw of claim 1 wherein said elastic compliant material comprises a thermoplastic material.

4. The screw of claim 3 wherein said thermoplastic material comprises polytetrafluoroethylene.

5. The screw of claim 1 wherein the threads extend along the entire shaft length.

6. The screw of claim 1 wherein the threads extend along a portion of the shaft length with a remaining portion of the shaft length being non-threaded and defining a shank portion.

7. The screw of claim 1 wherein the threaded portion has an outside thread diameter and wherein said elastic compliant material has a width equal to said outside thread diameter.

8. The screw of claim 7 wherein prior to a first use of the screw, the elastic compliant material adjacent to the screw threads has no threads.

9. A method of making a self-locking screw, said screw having an axis and comprising a head, a shaft and a tip, with the shaft having an axially-extending shaft length and a diameter with at least a portion of the shaft length being threaded, said method comprising:
    machining a slot into the shaft, said slot extending the entire diameter of the shaft and being open at the tip and having a slot width and a slot length with the slot length extending from the tip along a portion of the shaft length, said slot width being the same along said diameter of the shaft, said slot separating said shaft into a first screw part and a second screw part as a result of said slot extending along said portion of the shaft length,
    axially inserting an elastic compliant material into the slot,
    wherein self-locking torque is created by bending the first and second screw parts due to said elastic complaint material being axially-inserted into and filling said slot.

10. The method of claim 9 wherein said elastic compliant material is in the form of a sheet with the sheet having opposite sides and a thickness with the thickness being greater than the width of the slot.

11. The method of claim 10 wherein the threaded portion of the screw has an outside thread diameter and wherein the sheet has a width equal to the outside thread diameter.

12. The method of claim 11 wherein the sheet of elastic compliant material adjacent to the screw threads has no threads.

13. The method of claim 10 wherein subsequent to inserting the elastic compliant material into the slot, a gap exists at the tip of the screw, said gap being located between the opposite sides of the elastic compliant material and the screw, said method further comprising closing said gap.

14. The method of claim 10 wherein the sheet has a length with the length of said sheet being equal to the length of the slot.

15. The method of claim 9 wherein said elastic compliant material comprises a thermoplastic material.

16. The screw of claim 15 wherein said thermoplastic material comprises polytetrafluoroethylene.

\* \* \* \* \*